Patented Dec. 16, 1924.

1,519,286

UNITED STATES PATENT OFFICE.

KASPAR WINKLER, OF ALTSTETTEN, NEAR ZURICH, SWITZERLAND.

PROCESS FOR TREATING MORTAR, CEMENT, CONCRETE, AND THE LIKE.

No Drawing.  Application filed June 17, 1921.  Serial No. 478,436.

*To all whom it may concern:*

Be it known that I, KASPAR WINKLER, a citizen of Switzerland, residing at Gehrenweg 9, Altstetten, near Zurich, in the county of Zurich and State of Switzerland, have invented certain new and useful Improvements in a Process for Treating Mortar, Cement, Concrete, and the like, of which the following is a specification.

When carrying out hydraulic, drainage and other similar work it is generally found that a thoroughly waterproof and reliable building material is wanting. The known substances which have hitherto been added to mortar or the like to make it waterproof are, almost without exception, subject to prejudicial secondary or after-effects, which deprive them of all practical value. The usual accompanying effects consist in particular, in the impairment of the original good qualities of the mortar or cement and in the subsequent occurrence of efflorescence and cracks. For example, the addition of tar, which is always being recommended, even if used in the form of an emulsion, always results in a considerable reduction in the strength and adhering power, apart from other less serious disadvantages.

The execution of difficult work of the aforesaid nature calls for a material which, in addition to complete imperviousness, possesses also the said qualities at least to a normal degree.

A further circumstance is concerned with the former failures. The fact is generally overlooked that complete imperviousness to water alone is not sufficient to render mortar and cement suitable for carrying out such work in a permanent and reliable manner. Difficult hydraulic work such as stopping up incursions of water in tunnels and shafts, or packing or luting under water pressure—for example, cellars resisting underground water pressure and similar work—can only be carried out with a material which, in addition to the aforesaid properties, possesses also the further properties of extraordinarily quick, almost instantaneous, setting and of attaining nearly its full strength in a very short time. Packings and wall linings and the like, which are made with cement which takes the usual time to set, generally give way under the pressure of the water which is held back before the cement has set; but on the other hand, if the adhering power is insufficient, every trowelful of packing or coating material is immediately ejected as soon as it is spread. Under such circumstances, the fact that the material is impervious to water loses all importance. Therefore, in attempting to solve difficult problems of this nature, too much stress must not be placed on the theory, widely held to-day, that slow setting is a characteristic of good cement.

It has now been found that mortar, cement and concrete become completely waterproof and acquire all those properties which are indispensable for carrying out difficult hydraulic work, such as stopping up incursions of water and the like, particularly an increased adhering power and the property of unusually quick setting, if an alkali hydroxide solution of 10°–45° Bé. is used instead of water for mixing the materials.

Potassium hydroxide produces, in addition to complete impenetrability, and particularly great hardness and strength, an extraordinary increase in adhering power and accelerated setting.

The action of sodium hydroxide differs from that of potassium hydroxide chiefly in that the hardness and strength increase to a smaller degree, and setting is rather retarded, while the increase in adhering power on the other hand is still more considerable.

Undoubtedly in most of the hydraulic work that may have to be undertaken thoroughly satisfactory results in every respect can be obtained with a caustic potash solution. Nevertheless, in cases where the adhering power obtained thereby is still insufficient, the deficiency can be made up by the addition of a small quantity of caustic soda, about 2–7% with respect to the weight of the potassium solution. The employment of the caustic soda solution is only practicable, when slow setting and efflorescence are no hindrances.

The action of the alkali hydroxide solution is reinforced by the addition of manganese dioxide or coke of tar or both. These substances (the manganese dioxide preferably in the form of a dust-like powder) are stirred up or dissolved in the alkali hydroxide solution. The manganese dioxide can also be mixed with the dry lime, lime-sand mixture, cement or concrete mixture.

Coke of tar is favourable to adhering power. It is notable that, in contradistinction to tar, it produces no prejudicial secondary effects. The quantity to be used amounts at the maximum to about 5% of the weight of the alkali hydroxide solution.

Manganese dioxide increases all the valuable properties of the mortar and cement. The highest permissible amount is about 15% of the weight of the alkali hydroxide solution.

The choice of the alkali and the strength of the solution, as well as the employment of one or more of the aforesaid additional substances depends, on the one hand, on the conditions to be fulfilled at any particular time and, on the other hand, on the kind of cement and the nature of the water obtainable.

The present process is free from the difficulties mentioned at the beginning of the specification and with it the production of mortar, cement and concrete, which is suitable for carrying out hydraulic work, such as waterproofing and other difficult work of a similar nature in a permanent manner, becomes possible.

What I claim is:—

1. A process of treating cementitious material, consisting in mixing the cementitious material with an alkali hydroxide solution instead of with water, and incorporating finely-pulverized manganese dioxide with said material.

2. A process of treating cementitious material, consisting in mixing the cementitious material with an alkali hydroxide solution instead of with water, and incorporating finely-pulverized manganese dioxide and coke of tar with said material.

In testimony whereof I have affixed my signature.

KASPAR WINKLER.